United States Patent [19]

Stahl et al.

[11] Patent Number: 4,528,054
[45] Date of Patent: Jul. 9, 1985

[54] METHOD FOR MAKING OVERHEAD PROJECTION TRANSPARENCY

[75] Inventors: Torbjørn Stahl, Malmø, Sweden; Per Hektoen, Østerås; Oystein Karlsen, Oslo, both of Norway

[73] Assignee: Moore Business Forms, Inc., Grand Island, N.Y.

[21] Appl. No.: 615,516

[22] Filed: May 30, 1984

[30] Foreign Application Priority Data

Jun. 1, 1983 [NO] Norway ............................... 831979

[51] Int. Cl.³ ............................................ B32B 31/16
[52] U.S. Cl. ................................... 156/226; 156/204; 156/249; 156/277; 156/291
[58] Field of Search ........................ 40/158 B, 158 R; 156/204, 226, 227, 249, 277, 291, 308.2; 229/69, 70, 71; 283/1 B, 61, 62; 428/43, 124, 128; 493/188, 189

[56] References Cited

U.S. PATENT DOCUMENTS

| | | | |
|---|---|---|---|
| 3,361,041 | 1/1968 | Grob | 156/226 X |
| 3,814,518 | 6/1974 | Wichers | 40/158 B X |
| 4,063,641 | 12/1977 | Kuehn et al. | 156/204 X |
| 4,102,251 | 7/1978 | Steidinger | 156/226 X |
| 4,110,502 | 8/1978 | Baer | 428/124 X |
| 4,158,587 | 6/1979 | Keller et al. | 156/226 X |

Primary Examiner—Robert A. Dawson
Attorney, Agent, or Firm—Allegretti, Newitt, Witcoff & McAndrews, Ltd.

[57] ABSTRACT

The present invention provides a method for making overhead projection transparencies. According to the invention there is arranged a first web of a thin transparent plastic film on a second web of paper, said first web being attached along one longitudinal edge thereof by means of a line of adhesive, the upper face of the first web having a writable surface and the lower face thereof having a non-writable surface. In the longitudinal direction of the webs on the first of two sections of said writable surface of the first web, information may be written, e.g. in the form of diagrams, text etc. to be shown by overhead projection, while leaving the second section blank. Thereafter the second web or parts thereof are removed from the first web, whereafter the assembly of the first web and the possible remainder of the second web is folded such that the writable surfaces of the said two sections face each other, said writable surfaces being heat weldable to each other, after which the said assembly is fed through a heat sealing means to weld the said two sections together to produce the overhead transparency. The first and second webs may be provided as a continuous form, the second web having marginal edges with feeding holes for engagement with a feeding mechanism of a data printer or data drawing machine, suitably providing multi-color information on the said writable surface.

3 Claims, 7 Drawing Figures

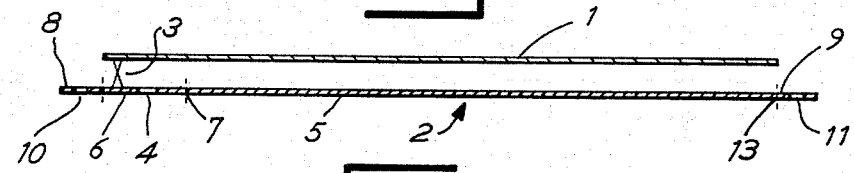
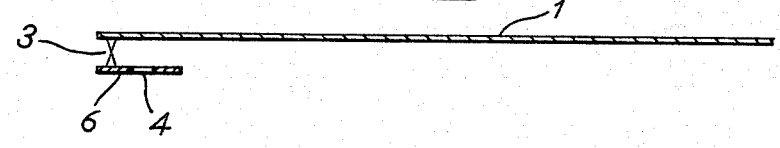
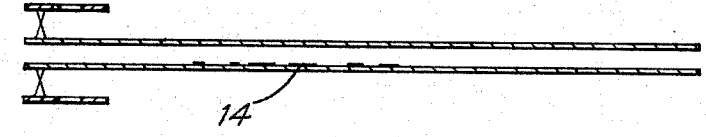
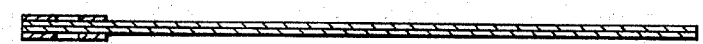
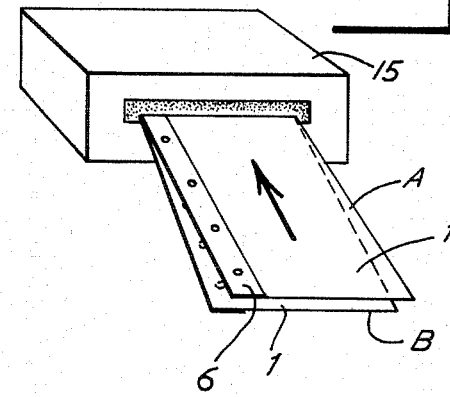

METHOD FOR MAKING OVERHEAD PROJECTION TRANSPARENCY

BACKGROUND OF THE INVENTION

Field of the Invention and Description of the Prior Art

The present invention relates to a method for making overhead projection transparencies.

Prior art overhead projection transparencies are normally made in the form of a transparent photocopy from a master which is placed on the glass plate of a photocopying machine. Before feeding the transparency through the photocopying machine, the transparency is either provided with strips of non-glossy material in order to suit the gripping mechanisms of the photocopying machine or attached to a paper backing serving as a support for the transparency and providing engagement with the feeding mechanism of the photocopying machine. Unless the photocopying machine is of the expensive multi-color type, such transparencies normally provide the information on the transparency in one color only, conventionally black. This one color representation on the transparency requires in several cases further treatment of the transparencies with colors from specially made pens in order to color diagrams etc. This is quite often a tedious and complicated task requiring utmost care in order to obtain a satisfactory result. One major disadvantage when applying color onto the transparency, is that the transparency has a very glossy surface, occasionally with an oily like coating.

SUMMARY OF THE INVENTION

It is therefore the primary object of the present invention to simplify the making of overhead projection transparencies, in particular such transparencies requiring multi-color information to be represented thereon.

From the prior art it is known to bake identity cards between two plastic films in order to avoid the information on the identity card from being tampered with. The present invention aims to carry this technique further in order to obtain an overhead projection transparency.

Suitable transparent plastic films are commercially available, e.g. in the form of polyethylene coated Mylar film, one face of which is smooth and glossy and the other being nonglossy and being suitable for writing thereon or printing thereon.

Thus, according to the invention, the method consists in arranging a first web of a thin transparent plastic film on a second web of paper, the first web being attached along one longitudinal edge thereof by means of a line of adhesive, the upper face of the first web having a writable or printable surface and the lower face thereof having a non-writable/non-printable surface, writing or printing information in the longitudinal direction of the webs on a first of two sections of said writable or printable surface of the first web, while leaving the second section blank, such information being e.g. diagrams, text etc., to be displayed by overhead projection, removing the second web or parts thereof from the first web, folding the first web and any possible remainder of the second web such that the writable/printable surfaces of the said two sections face each other, said writable/printable surfaces being heat weldable to each other, and feeding the assembly of the first web and any remainder of the second web through a heat sealing means to weld the said two sections together to produce the overhead transparency.

Thus, the present invention makes it possible to print out overhead projection transparencies directly on a conventional printer or a color printer.

The vast growth in the field of microcomputers with the options for colorgraphics on a display screen have led to an increased use of color-printers in order to produce in due course from a paper master overhead projection transparencies by means of said multi-color photocopying machine.

The present method for making an overhead projection transparency, e.g. from a continuous assembly of said two webs, will therefore substantially simplify and encourage the making of transparencies having graphics or multicolor information thereon.

BRIEF DESCRIPTION OF THE DRAWINGS

Further features of the present invention will appear from the subsequent claims as well as from the description with reference to the attached drawings.

FIG. 3 illustrates in cross-section the two webs of FIG. 1 in a schematic form;

FIG. 4 is a schematic cross-section of the view shown in FIG. 2;

FIG. 5 illustrates the assembly of the first web and the possible remainder of the second web before heat welding the two writable surfaces to each other;

FIG. 6 illustrates the completed transparency; and

FIG. 7 illustrates the said assembly of FIG. 5 before being fed into a heat welding apparatus.

DETAILED DESCRIPTION OF THE PREFERRED EMBODIMENT

Figure 1:
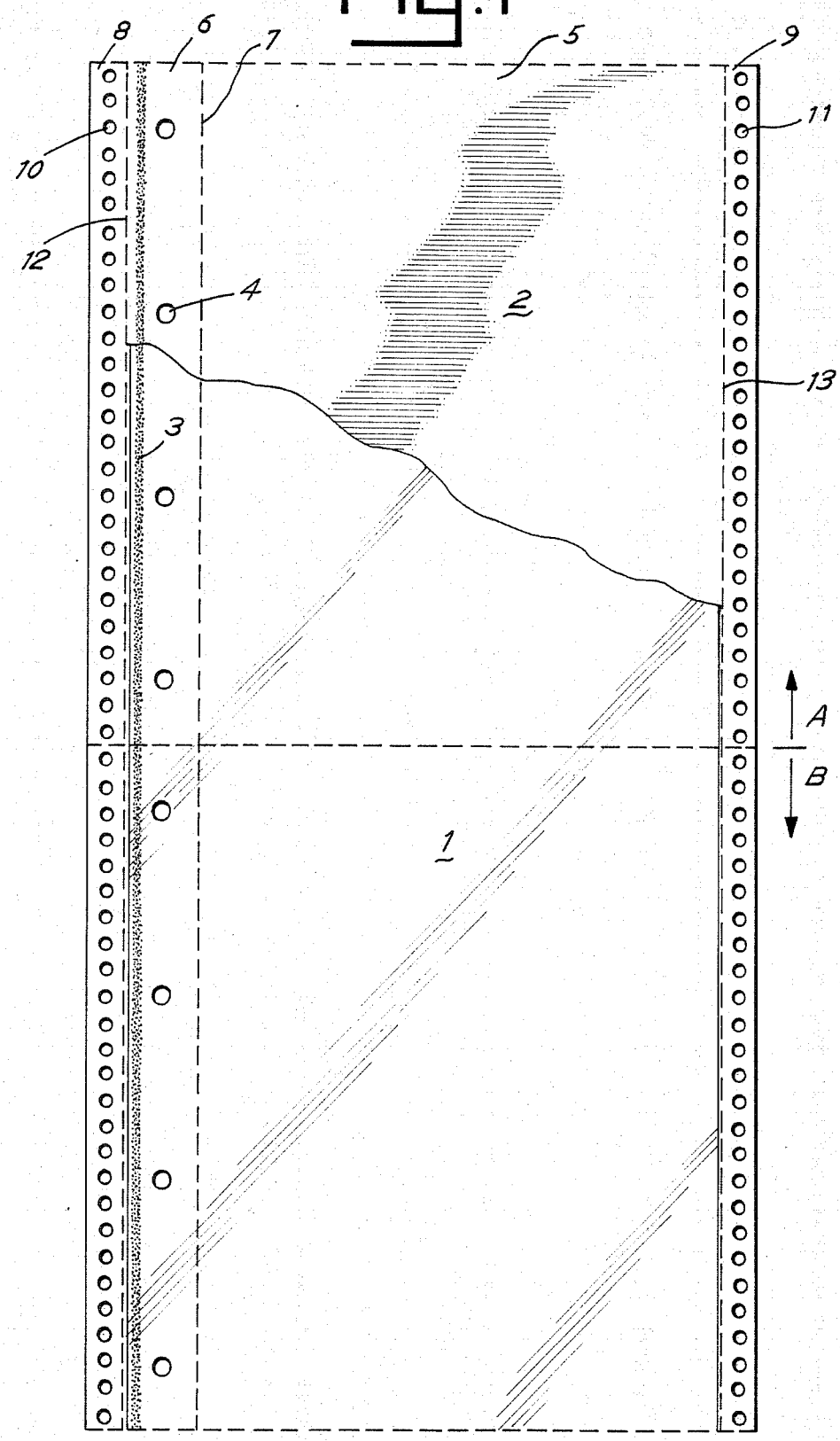
FIG. 1 is a top plan view of the first and second webs according to the invention.
Figure 2:
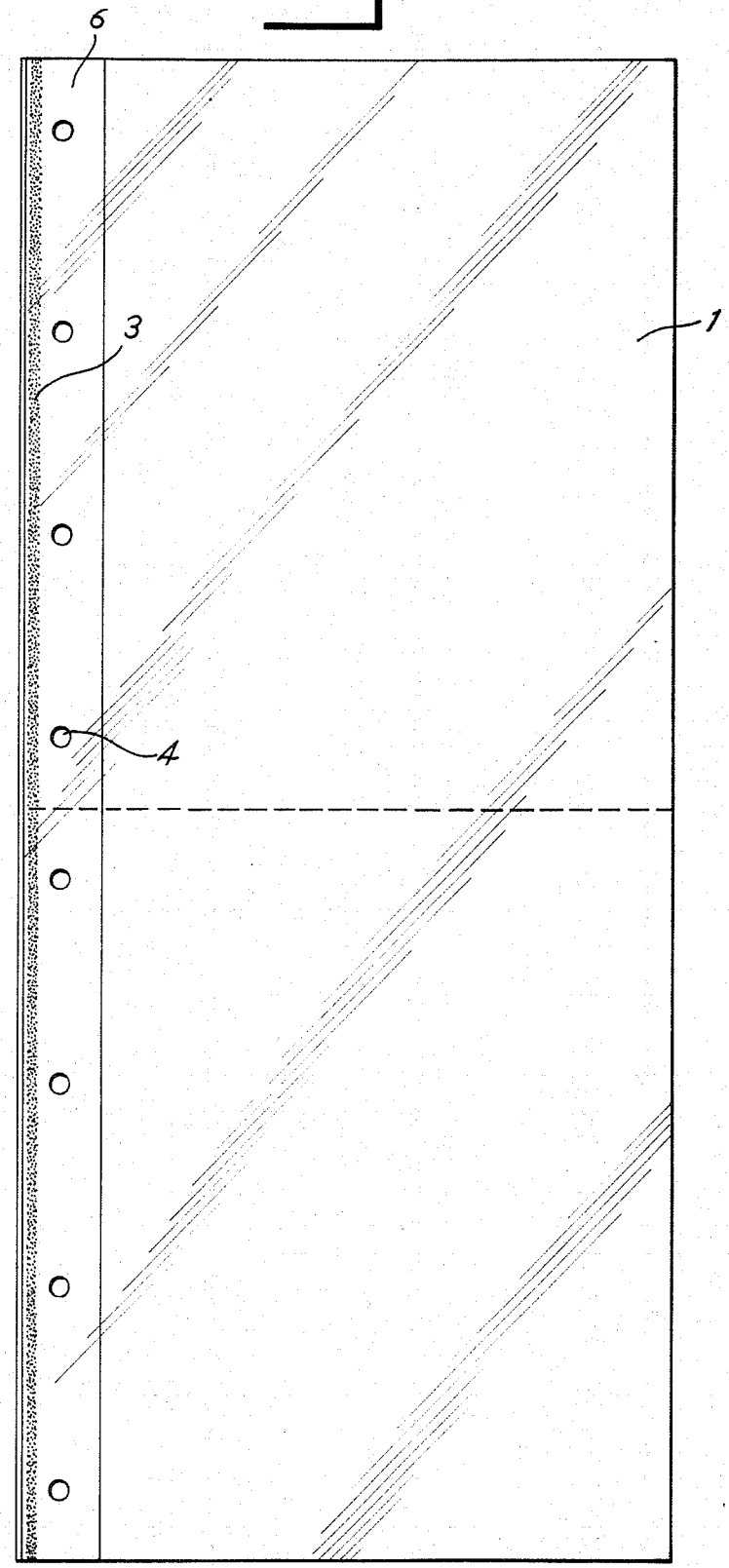
FIG. 2 is a plan view of the first web together with a remainder of the second web.

In FIG. 1, there is provided a first web 1 of thin transparent plastic film, on its upper side having a non-glossy and writable/printable surface and a lower face having a glossy surface and facing the second web 2, said second web being made from paper. The first web is attached to the second web by means of a line of adhesive 3 along one longitudinal edge of said first web, as also clearly indicated in FIG. 3. The second web and possibly the first web 1 may be provided with holes 4 to enable the completed transparency to be easily inserted into a binder.

In general, the second web 2 may be comprised of a major portion 5 and a strip-like portion 6 to which the first web is attached. The portions 5 and 6 may be separable by means of a line of perforations 7. In the embodiment shown in FIG. 1, the second web has also marginal edges 8 and 9 having feeding holes 10 and 11 to engage the feeding mechanism of a data printer. These marginal edges 8 and 9 are removable in conventional manner from the second web along lines of perforations 12 and 13, respectively.

It is thus understood that the present invention may be applicable to the two section version shown in FIG. 1 or be made as a continuous form to be suitable for data-printers.

Information is printed by means of a data printer or a data-drawing machine capable of multi-color printing. The information is printed either on section A or on section B, e.g. as symbolically indicated by the reference numeral 14 in FIG. 5.

Once printing on one of the sections of the film has been made, the marginal edges of the web 2 are removed together with the removal of the portion 5 of the web 2. Thereafter, the first web 1 together with the remainder 6 of the second web 2 are folded as clearly indicated in FIG. 5 and heat welded together through a heat welding apparatus 15, as clearly indicated in FIG. 7.

It is to be understood that the present invention by no means is limited to the embodiment as shown in FIG. 5, since the present two webs may be provided in sets each containing the said two section A and B and without any marginal strips 8 and 9. In this version, information may be provided on the film 1 by conventional printing technique or in a multi-color drawing machine not requiring the said marginal strips 8 and 9.

We claim:

1. A method for making overhead projection transparencies, characterized by the steps of arranging a first web of a thin transparent plastic film on a second web of paper, said first web being attached along one longitudinal edge thereof by means of a line adhesive, the upper face of the first web having a writable/printable surface and the lower face thereof having a non-writable/non-printable surface, in the longitudinal direction of the webs on a first of two sections of said writable/printable surface of the first web, providing information to be displayed by overhead projection, while leaving the second section blank, removing the second web or portions thereof from the first web, folding the first web and any remainder of the second web such that the writable/printable surfaces of the said two sections face each other, said writable/printable surfaces being heat weldable to each other, and feeding the assembly of the first web and any remainder of the second web through a heat sealing means to weld the said two sections together to produce the overhead transparency.

2. A method according to claim 1, characterized in that information is provided in multi-colors.

3. A method according to claim 1 characterized in that first and second webs are made as a continuous form, the second web having at least one marginal strip with feeding holes.

* * * * *